INVENTOR.
HAROLD G. CAMNITZ
BY Hoffman Stone
Frank C. Parker
ATTORNEYS

United States Patent Office 3,058,067
Patented Oct. 9, 1962

3,058,067
BRIDGE PRODUCING DIRECT CURRENT OUTPUT IN RESPONSE TO AMPLITUDE OR PHASE DIFFERENCE OF ALTERNATING CURRENT INPUT OR INPUTS
Harold G. Camnitz, East Aurora, N.Y., assignor to Bausch & Lomb Incorporated, Rochester, N.Y., a corporation of New York
Filed Feb. 21, 1961, Ser. No. 90,835
8 Claims. (Cl. 328—26)

This invention relates to a novel alternating current bridge circuit for producing a direct current output signal in response to a selected condition or electrical input signal, and more particularly, but not necessarily exclusively, to a novel circuit of this kind including an electrical integrator in its output portion whereby the rate of change of the output signal is responsive to the input signal or condition.

There are many situations in designing electrical circuits where it is desired to produce a direct current output signal responsive to a condition, or to an electrical input signal of either direct or alternating character. There are also many fields of use such as in electrical servo systems, where it is desired to provide a direct current output voltage, the rate of change of which is responsive to an input signal or to a selected condition, that is, to produce an output signal that represents the integral taken over a relatively long period of time of an input signal or a selected condition, and to feed back the output signal to control the input signal or condiiton. It has heretofore been relatively difficult to do this without rendering the servo system unstable.

Accordingly, one important object of the present invention is to provide a novel alternating current powered bridge circuit for producing a direct current output signal responsively to a condition or to a selected electrical input signal.

Other objects are: to provide a novel circuit of this type including a relatively long integrating time constant in its output portion, yet having relatively rapid response characteristics so that it may be used in a feedback circuit without rendering the feedback circuit unstable; to provide a novel circuit of this type which is capable of a relatively wide variety of uses in connection with many different types of electrical equipment; and to provide a novel bridge circuit of this kind which is simple and inexpensive in construction, yet highly versatile and flexible in operation.

The foregoing and other objects and advantages of the invention will become apparent in the following detailed description thereof, taken in conjunction with the drawings wherein.

The circuit of the present invention is energized by alternating current, thus avoiding the need for a direct current power supply. It produces a direct current output signal which may be made to correspond to the mathematical integral of the input signal or condition taken over a relatively long time period, yet the circuit has a relatively rapid response characteristic so that it may be used in electrical systems of the servo type without adversely affecting the stability of the systems.

Briefly, the invention contemplates a bridge circuit including two unidirectional circuit elements electrically oriented in the same direction and arranged in series in adjacent arms on one side of the bridge relative to the power input. Bidirectional circuit elements are connected in the two arms on the opposite side of the bridge. A capacitor either alone or in series with a resistor is connected across the bridge between the two arms, and a signal input means such as a transducer or other variable impedance device is connected in series in one of the arms of the bridge.

In operation, the capacitor charges to a voltage dependent upon the bridge unbalance, which is affected by changes in the variable impedance element. In the case where a resistor is placed in series with the capacitor, the output voltage is integrated so that its rate of change is responsive to the input signal. The condition or input signal is sampled during alternate one-half cycles of the alternating current power supply, during which times the capacitor charges or discharges according to changes in the condition or input signal that have occurred since the last previous sampling period. During the intermediate periods, the capacitor retains its charge, and can discharge only through the output circuit to which it is connected (leaving aside the usually negligible effects of leakage). Thus, the output signal may be in the form of a relatively slowly changing direct current voltage. When the input signal is an alternating voltage of the same frequency as the energizing power supply, the bridge is phase sensitive, and the departure of the output signal from its zero input value indicates the phase relationship between the input signal and the energizing power supply.

Figure 1:
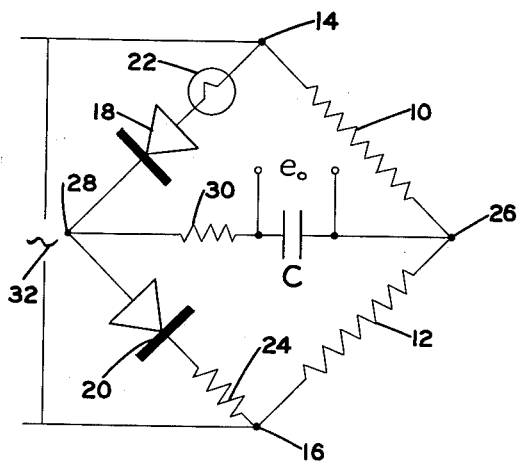
FIG. 1 is a schematic circuit diagram according to a first embodiment of the invention.

Referring now to the drawings, a circuit according to a first embodiment of the invention, and illustrating the basic principles thereof is shown in FIG. 1. This circuit includes a pair of resistors 10 and 12, or other bidirectional impedance elements connected in series with each other on one side of the bridge between the power input terminals 14 and 16. A pair of unidirectional circuit elements 18 and 20, such as the solid state diodes illustrated are connected in series with each other on the opposite side of the bridge between the power input terminals 14 and 16. A thermistor 22, or other condition responsive variable impedance element is series-connected in the arm of the bridge that includes the first unidirectional element 18, and a relatively constant impedance element such as the resistor 24 is series-connected in the arm that includes the second unidirectional element 20. A capacitor C is connected across the bridge between the common junction 26 of the two resistors 10 and 12 and the common junction 28 of the unidirectional current devices 18 and 20.

It should be especially noted that the two unidirectional current devices are both oriented in the same direction relative to the energizing alternating current source 32.

As shown, an integrating resistor 30 is series-connected with the capacitor C, but will be understood that the value of the integrating resistor 30 may be as small as desired. The integrating resistor 30 may be omitted if desired, as would be the case where only minimum integration of the output signal is desired. The input signal in this circuit is in the form of changes in the impedance of the variable impedance element 22, and the output signal, $e_o$, is the voltage developed across the capacitor C.

In operation, during one-half of the energizing voltage cycle, current flows on both sides of the bridge, and the capacitor C charges or discharges toward the value of the voltage between the two intermediate terminals 26 and 28 of the bridge. During the succeeding half cycle of the energizing voltage, the two unidirectional current devices 18 and 20 are biased in their reverse directions, and the capacitor C is effectively isolated, or "locked up," and can discharge only through an output circuit (not shown). The circuit thus samples the condition of the variable impedance device 22 at the frequency rate of the energizing alternating current source 32 and produces a direct current output voltage $e_o$ across the capacitor. The integration interval may be controlled by appropriate selection of the values of the resistor 30 and capacitor C in accordance with well-known principles.

Figure 2:
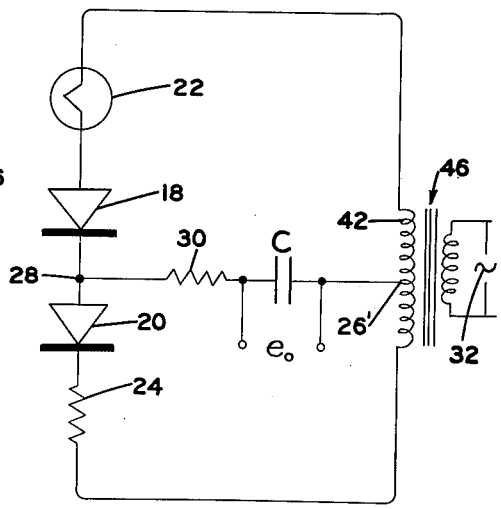
FIG. 2 is a schematic diagram of a circuit according to a second embodiment of the invention.

The circuit illustrated in FIG. 2 is generally similar to the circuit shown in FIG. 1, except that the energizing current is supplied through a transformer 46 having a center-tapped secondary winding 42, the two halves of which function as the bidirectional arms of the bridge in place of the resistors 10 and 12 shown in the circuit of FIG. 1. The transformer 46 is the power input transformer for the circuit and the capacitor C is connected between the center tap 26' of the transformer secondary and the junction 28 between the two unidirectional circuit devices 18 and 20.

Figure 3:
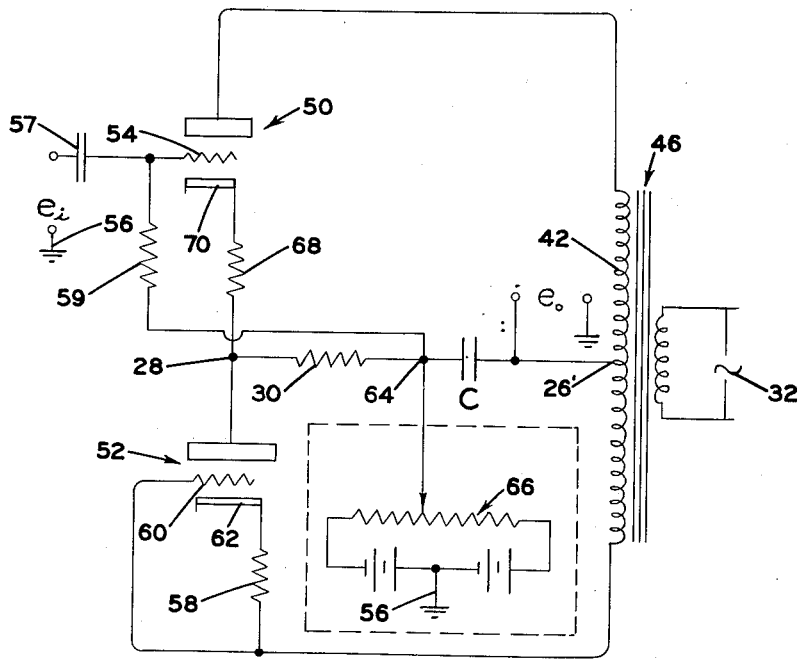
FIG. 3 is a schematic diagram of a circuit according to a third embodiment of the invention, using triode vacuum tubes and biasing means therefor.

A circuit according to a further modification of the invention is illustrated in FIG. 3, and includes a pair of vacuum tubes 50 and 52, or other variable discharge devices in the arms of the circuit opposite from the input transformer 46. As shown, the input signal $e_1$ is applied between the grid 54 of the first triode vacuum tube 50 and a point of reference potential 56 hereinafter referred to as ground. A D.C. blocking capacitor 57 may be connected in series between the grid 54 and the input signal source (not shown) if required.

The two vacuum tubes 50 and 52 are self-biased degeneratively by respective cathode resistors 63 and 58, the values of which are selected in view of the operating characteristics of the respective tubes 50 and 52. The grid 54 of the first tube is connected through an input resistor 59 to the common terminal 64 between the resistor 30 and the capacitor C in the integrating network. The grid 60 of the second tube 52 is connected to the terminal of the cathode resistor 58 remote from the cathode 52.

Preferably, for optimum operation of the circuit in most presently known applications, the two vacuum tubes 50 and 52 are as nearly similar as possible, and the two cathode resistors are of equal values, thus making the circuit substantially symmetrical and maximizing the linearity of its response characteristic.

The vacuum tubes 50 and 52 are connected in cascode, or series for conduction in the same direction relative to the transformer secondary 42. The common junction 64 between the integrating resistor 30 and the capacitor C is connected to ground through a level adjusting voltage divider 66, which may be varied to adjust the voltage output of the circuit relative to ground. Preferably, however, the voltage divider 66 is adjusted for optimum operation of the circuit in view of the operating characteristics of the triodes 50 and 52 and the nature of the input signal $e_1$. Adjustment of the voltage divider 66 controls the level of the output voltage $e_o$ relative to ground without otherwise affecting the operation of the circuit. In this case the output voltage $e_o$ is taken between the transformer center tap 26' and ground, and may be regarded as the algebraic sum of the biasing voltage derived from the voltage divider 66 and the voltage across the capacitor C.

When the circuit is used in electrical servo systems, it has been found that its operating characteristics may be optimized by adjusting the value of the biasing voltage in accordance with the operating characteristics of the vacuum tubes 50 and 52 so that when the circuit is at its nominal equilibrium condition, it is out of balance with a voltage existing across the capacitor C.

The operation of this circuit shown in FIG. 3 is relatively complex. Similarly to the circuits illustrated in FIGS. 1 and 2, the circuit shown in FIG. 3 samples the input signal $e_1$ at the frequency rate of the power source 32, and produces a direct current output voltage $e_o$ across the capacitor C. However, the circuit shown in FIG. 3 is relatively rapid in response because of the amplifying effect of the signal input triode 50 in conjunction with the second triode 52.

The integrating resistor 30 is in the cathode circuit of the signal input triode 50, and provides a feed-back voltage, the effect of which is to increase the effective integrating time constant of the output signal.

The values of the various parameters of the circuits shown in the drawing are not critical, but may be varied over a wide range according the designer's choice and the purposes for which the circuit is intended. The following table lists the values of the various different circuit elements used in one actual embodiment of the circuit shown in FIG. 3 that has been found to have desirable operating characteristics in an electrical servo type control system for regulating the dynode voltage of a photomultiplier tube. A dual triode, type 12AX7, was used for the two vacuum tubes 50 and 52. The transformer 46 was wound to produce an output voltage of 230 volts R.M.S. across its secondary winding 42 in response to energization of its primary winding by standard 115 volt, 60 cycle current. The voltage divider 66 was designed to have a negligible impedance, and set at minus 20 volts. The values of the other circuit elements were as follows:

| | |
|---|---|
| The grid resistor 59 _____ohms__ | 470,000 |
| The cathode resistors 58 and 68, each ___do____ | 10,000 |
| The integrating resistor 30 _____megohm__ | 1 |
| The integrating capacitor C _____mfd.__ | 1 |

The circuits of the invention are capable of producing direct current output signals in response to a selected condition or an electrical input signal with exceptionally little alternating current ripple content. They have a relatively high degree of stability and do not require the use of relatively expensive direct current power supplies.

What is claimed is:

1. An electrical bridge circuit comprising on one side a pair of bidirectional current devices connected in series with each other, and on the opposite side a pair of unidirectional current devices connected in series and electrically oriented in the same direction, a capacitor connected between the point of connection of said bidirectional devices and the point of connection of said unidirectional devices, and a variable impedance device in series with one of said bidirectional and unidirectional devices, whereby when an alternating voltage is applied between the points of connection between said bidirectional devices and said unidirectional devices, a direct voltage is developed across said capacitor, the direct voltage being responsive to said variable impedance device.

2. An electrical bridge circuit comprising a power input transformer having a center tapped secondary winding, a pair of unidirectional current devices connected in series with each other between the end terminals of said secondary winding, a variable impedance device connected in series with said unidirectional devices, and a capacitor connected between the center tap of said secondary winding and a point in the circuit between said unidirectional devices, whereby when an alternating energizing voltage is applied to the primary winding of said transformer a direct voltage is developed across said capacitor, the direct voltage being responsive to said variable impedance device.

3. An electrical bridge circuit for producing an output signal corresponding to the integral of an input signal or condition comprising on one side a pair of bidirectional current devices connected in series with each other, and on the opposite side a pair of unidirectional current devices connected in series and electrically oriented in the same direction, a capacitor and a resistor connected in series with each other between the point of connection of said bidirectional devices and the point of connection of said unidirectional devices, and a variable impedance device in series with one of said bidirectional and unidirectional devices, whereby when an alternating voltage is applied between the points of connection between said bidirectional devices and said unidirectional devices, a direct voltage is developed across said capacitor, the direct voltage being responsive to said variable impedance device.

4. An electrical bridge circuit for producing an output signal corresponding to the integral of an input signal or condition comprising a power input transformer having a center tapped secondary winding, a pair of unidirectional current devices connected in series with each other between the end terminals of said secondary winding, a variable impedance device connected in series with said unidirectional devices, and a capacitor and a resistor connected in series with each other between the center tap of said secondary winding and a point in the circuit between said unidirectional devices, whereby when an alternating energizing voltage is applied to the primary winding of said transformer a direct voltage is developed across said capacitor, the direct voltage being responsive to said variable impedance device.

5. An electrical bridge circuit for producing an output signal corresponding to the integral of an input signal or condition comprising a power input transformer having a center tapped secondary winding, a pair of grid-controlled vacuum tubes connected in series across said secondary winding, the plate of one of said tubes being connected to one end terminal of said secondary winding and the cathode of the other one of said tubes being connected to the other end terminal of said secondary winding, the cathode of said one tube being connected to the plate of said other tube, an electrical integrating network connected between the center tap of said secondary winding and the common terminal between said vacuum tubes, and means for applying an input signal between the control grid of one of said vacuum tubes and a selected point in said integrating circuit.

6. An electrical bridge integrator circuit comprising a power input transformer having a center tapped secondary winding, a pair of unidirectionally conducting controllable discharge devices connected in series across said secondary winding, each one of said discharge devices having a control electrode, both of said devices being oriented for conduction in the same direction, an integrating network connected between the center tap of said secondary winding and a circuit point between said discharge devices, means for applying an input signal between the control electrode of one of said discharge devices and a selected circuit point in said integrating network, and biasing means for biasing said discharge devices, whereby said integrating circuit is operative to produce a direct voltage responsive to an input signal when an alternating energizing voltage is applied to the primary of said input transformer.

7. An electrical bridge integrator circuit comprising a power input transformer having a center tapped secondary winding, a pair of unidirectionally conducting controllable discharge devices connected in series across said secondary winding, each one of said discharge devices having a control electrode, both of said devices being oriented for conduction in the same direction, a resistor and a capacitor connected in series between the center tap of said secondary winding and a circuit point between said discharge devices, said resistor being connected between said circuit point and siad capacitor, means for applying an input signal between the control electrode of one of said discharge devices and a circuit point between said resistor and said capacitor, and means for adjusting the potential of a selected point in said circuit relative to a point of reference potential.

8. An electrical bridge circuit for producing an output signal corresponding to the integral of an input signal or condition comprising a power input transformer having a center tapped secondary winding, a pair of grid-controlled vacuum tubes connected in series across said secondary winding, the plate of one of said tubes being connected to one end terminal of said secondary winding and the cathode of the other one of said tubes being connected to the other end terminal of said secondary winding, the cathode of said one tube being connected to the plate of said other tube, an electrical integrating network connected between the center tap of said secondary winding and the common terminal between said vacuum tubes, biasing resistors series connected with the cathodes of said vacuum tubes for biasing them, means for applying an input signal between the control grid of one of said vacuum tubes and a selected point in said integrating circuit, and means for adjusting the potential of said selected point relative to a point of reference potential thereby to adjust the operating equilibrium condition of said circuit when it is used in an electrical servo system, the output signal of said circuit being the algebraic sum of the voltage across said capacitor and the voltage applied by said adjusting means.

References Cited in the file of this patent

UNITED STATES PATENTS 2,597,886    McCoy _____ May 27, 1952